US009327754B2

(12) United States Patent
Mastromatto et al.

(10) Patent No.: US 9,327,754 B2
(45) Date of Patent: May 3, 2016

(54) TARPAULIN
(71) Applicant: MC Inventors, Inc., Ambler, PA (US)
(72) Inventors: Robert Mastromatto, Ambler, PA (US); Frank Cerminara, Jr., Chalfont, PA (US)
(73) Assignee: MC Inventors, Inc., Ambler, PA (US)
( * ) Notice: Subject to any disclaimer, the term of this patent is extended or adjusted under 35 U.S.C. 154(b) by 0 days.
(21) Appl. No.: 14/494,859
(22) Filed: Sep. 24, 2014
(65) Prior Publication Data
US 2016/0083001 A1 Mar. 24, 2016
(51) Int. Cl.
B62B 15/00 (2006.01)
B65D 33/06 (2006.01)
B62B 17/06 (2006.01)
B29L 7/00 (2006.01)
(52) U.S. Cl.
CPC .............. B62B 15/00 (2013.01); B62B 15/007 (2013.01); B62B 17/061 (2013.01); B65D 33/06 (2013.01); B29L 2007/005 (2013.01); B62B 2205/00 (2013.01); B62B 2205/02 (2013.01); D10B 2505/18 (2013.01)
(58) Field of Classification Search
CPC ...... B62B 15/00; B62B 15/007; B62B 17/00; B62B 17/061; B62B 2205/00; B62B 2205/02; D10B 2205/18; B29L 2007/005; Y10T 428/24033
See application file for complete search history.

(56) References Cited

U.S. PATENT DOCUMENTS

| 2,624,886 | A | * | 1/1953 | Herman | D06H 5/00 |
| | | | | | 112/418 |
| 2,974,971 | A | * | 3/1961 | Herman | A01G 1/12 |
| | | | | | 280/19 |
| 3,355,187 | A | | 11/1967 | Brindle | |
| 3,622,428 | A | * | 11/1971 | Robinson | B29C 70/202 |
| | | | | | 156/246 |
| 3,987,592 | A | * | 10/1976 | Herminghaus | B29C 66/1122 |
| | | | | | 135/115 |
| 4,173,351 | A | | 11/1979 | Hetland | |
| 4,682,447 | A | * | 7/1987 | Osborn | A01G 1/12 |
| | | | | | 135/119 |
| 4,803,109 | A | * | 2/1989 | Saniscalchi | A41D 27/24 |
| | | | | | 112/420 |
| 5,104,133 | A | | 4/1992 | Reiner | |
| 5,211,434 | A | | 5/1993 | Lanava | |
| 5,529,321 | A | | 6/1996 | Thompson | |
| 5,660,402 | A | | 8/1997 | Jones et al. | |
| 5,836,593 | A | * | 11/1998 | Skinner | B65G 7/02 |
| | | | | | 280/19 |
| 5,943,831 | A | | 8/1999 | Pangburn | |
| 6,154,884 | A | * | 12/2000 | Dehner | A41D 13/02 |
| | | | | | 2/69 |

(Continued)

OTHER PUBLICATIONS

Yama Mountain Gear website "Craftsmanship", Internet Archive Wayback Machine capture from Aug. 22, 2014 (www.yamamountaingear.com/craftsmanship/).*

Primary Examiner — Joseph Rocca
Assistant Examiner — Steve Clemmons
(74) Attorney, Agent, or Firm — Howson & Howson LLP

(57) ABSTRACT

A hauling tarpaulin for landscaping and similar uses is composed of a flexible first sheet of fiber-reinforced plastics material and a flexible second sheet of plastics material. The first and second sheets are connected to each other with the top face of the second sheet in facing contact with the bottom face of the first sheet. The second sheet has smooth bottom face, a thickness greater than the thickness of the first sheet, and a flexibility allowing both sheets to be rolled or folded for storage. The sheets are secured to each other by rows of stitching, and the stitching is protected from abrasion by protective strips. The stitching passes through intermediate strips to which the protective strips are secured by an adhesive layer.

20 Claims, 4 Drawing Sheets

(56) References Cited

U.S. PATENT DOCUMENTS

| | | | |
|---|---|---|---|
| 6,497,934 B1 * | 12/2002 | Mahn, Jr. | A41D 27/24 428/355 CN |
| 6,565,101 B2 | 5/2003 | Jones et al. | |
| 7,267,135 B2 * | 9/2007 | Hardee | E04H 15/32 135/115 |
| 7,726,710 B2 * | 6/2010 | Handwerker | E04G 21/24 294/215 |
| 8,091,937 B2 | 1/2012 | Mastromatto et al. | |
| 8,518,511 B2 * | 8/2013 | Harward | A41D 27/245 428/189 |
| 8,869,813 B2 * | 10/2014 | Kanayama | D03D 1/00 135/115 |
| 2005/0263998 A1 | 12/2005 | Edwards | |
| 2009/0233042 A1 * | 9/2009 | Sadato | A41D 27/24 428/104 |
| 2011/0241300 A1 * | 10/2011 | Schioler | A01M 31/006 280/19 |
| 2012/0326404 A1 * | 12/2012 | Row | B25H 5/00 280/18 |

* cited by examiner

TARPAULIN

FIELD OF THE INVENTION

This invention relates to tarpaulins, and more particularly to a tarpaulin for use in hauling materials such as leaves, landscaping debris, landscaping materials such as mulch, and the like over terrain.

BACKGROUND OF THE INVENTION

Tarpaulins, also known as "tarps," are primarily used as protective covers for piles of material or stacks of objects. However, they are also commonly used to haul materials across the ground. For example, after raking or blowing leaves, landscapers frequently use tarps, to collect the leaves and transport them for disposal. Tarps can also be used to transport other landscaping debris such as sticks and other plant matter, as well as soil, mulch and various other materials. A large tarp, e.g., a 3.5×2.5 meter rectangular tarp, can be used to haul a quantity of material equivalent to as many as five to ten wheelbarrow loads.

Tarps are manufactured from a wide variety of materials. A tarp used for hauling is typically composed of a nylon-fiber-reinforced vinyl sheet. Typical landscaping tarps are described in the following U.S. Pat. No. 2,974,971, granted to H. H. Buck on Mar. 14, 1961; U.S. Pat. No. 3,355,187, granted to M. Brindle on Nov. 28, 1967; U.S. Pat. No. 5,104,133, granted to D. Reiner on Apr. 14, 1992; U.S. Pat. No. 5,529,321, granted to G. Thompson on Jun. 25, 1996; U.S. Pat. No. 5,660,402, granted to E. Jones et al. on Aug. 26, 1997; U.S. Pat. No. 5,943,831, granted to W. Pangburn on Aug. 31, 1999; and U.S. Pat. No. 6,565,101, granted to B. Jones et al. on May 20, 2003.

When a tarp is used to haul materials such as landscaping debris, it is dragged along the ground, and friction and abrasion between the tarp and the surface on which it is dragged can cause rapid deterioration of the tarp. Depending on the material from which it is made, and the manner in which it is used, the tarp can reach the point at which it is no longer useful in a few weeks, or even a few days.

One solution to the problem of deterioration by abrasion is to use a sled-like device instead of a tarp. One such device is described in U.S. Pat. No. 4,173,351, granted to Philip R. Hetland on Nov. 6, 1979. Another such device is described in U.S. Pat. No. 5,211,434, granted to Santo M. Lanava on May 18, 1993. Still another sled-like device is described in U.S. patent application publication 2005/0263998, published on Dec. 1, 2005. A difficulty with such a sled-like device is that, if it is large enough to hold several wheelbarrow loads of material, it cannot be stored easily, and cannot be transported easily on a landscaper's vehicle.

Our U.S. Pat. No. 8,091,937, granted Jan. 10, 2012, addresses the problem of storage by providing a tarpaulin with plural rigid glides attached to a flexible sheet and positioned on the flexible sheet at locations such that the sheet can be folded on fold lines extending between the glides. More particularly, the tarpaulin of U.S. Pat. No. 8,091,937 comprises a flexible, foldable, sheet having opposite front and back edges spaced from each other in a lengthwise direction, opposite side edges spaced from each other in a widthwise direction, a top face and a bottom face. The top side of each of a plurality of substantially rigid synthetic resin glides, each having a top side and a bottom side, are attached to the bottom face of the sheet, and the bottom sides of the glides are sufficiently smooth to enhance sliding of the sheet on a supporting surface. The glides are spaced from one another in an array such that the sheet can be folded on itself along fold lines extending between adjacent glides from one edge of the sheet to an opposite edge of the sheet. A central portion of the bottom side of each of the glides is convex, and surrounded by a rim which is unitary with the central portion. The rim of each glide is in facing relationship with a part of the flexible, foldable sheet, and secured against movement relative to the part of the flexible, foldable sheet with which it is in facing relationship.

The tarpaulin of U.S. Pat. No. 8,091,937 is both highly durable and easily folded for storage. However, the convex shape of the central part of each of the glides, and the need to attach a rim of each of the glides to the flexible sheet, makes manufacture of the tarpaulin expensive.

BRIEF SUMMARY OF THE INVENTION

This invention not only addresses the problems of abrasion and storage encountered in previously proposed hauling devices, but also provides a durable tarpaulin that can be stored and transported easily.

The tarpaulin of this comprises a flexible first sheet of fiber-reinforced plastics material having a top face and a bottom face, and a flexible second sheet of plastics material also having a top face and a bottom face. The first and second sheets are connected to each other with the top face of the second sheet in facing contact with the bottom face of the first sheet. The second sheet has smooth bottom face, a thickness greater than the thickness of the first sheet, and sufficient flexibility to allow both sheets to be rolled for storage. With still greater flexibility, the second sheet can allow both sheets to be folded for storage.

In a preferred embodiment of the tarpaulin the flexible first sheet has a front edge, a rear edge, and first and second opposite side edges, each side edge of the first sheet extending from the front edge to the rear edge. The flexible second sheet similarly has a front edge, a rear edge, and first and second opposite side edges, each side edge of the second sheet extending from the front edge of the second sheet to the rear edge of the second sheet. The rear edge and the first and second side edges respectively of the second sheet are in substantially parallel, inwardly spaced relationship to the rear edge and first and second side edges of the first sheet, forming margins along the rear and side edges of the second sheet. The front edge of the first sheet is also spaced inwardly from the front edge of the second sheet forming a margin along the front edge of the second sheet. The second sheet is secured along each of its front, rear and side edges to the first sheet by fastening means extending through both sheets, and an elongated protective strip underlies the fastening means. Thus, when the tarpaulin is being pulled and the bottom face of the second sheet is in sliding contact with terrain, the fastening means is prevented from coming into direct contact with the terrain.

The fastening means is preferably stitching, using for example nylon yarn, with the stitches extending through the top face of the first sheet and through the bottom face of the second sheet. However, alternative fastening means, for example metal wire, grommets, rivets, staples and the like can be used.

In a preferred embodiment, four intermediate strips of fiber-reinforced plastics material are also provided. Each of these four intermediate strips extends along an area of the bottom face of the second sheet adjacent a different one of the front, rear, and side edges of said second sheet.

In addition, protective strips of fiber-reinforced plastics material are provided. Each of the protective strips has a first part underlying a different one of the above-mentioned four intermediate strips of fiber-reinforced plastics material, and can have a second part underlying a portion of the bottom face of the first sheet adjacent an edge of the second sheet. Each protective strip is adhesively secured both to one of the four intermediate strips of fiber-reinforced plastics material and to an adjacent area of the bottom face of the first sheet. The protective strips prevent abrasive deterioration of the exposed parts of the stitches.

The second sheet may be composed of a plastics material having a smooth surface to facilitate gliding of the tarpaulin over terrain. Polyethylene is a preferred material as it is relatively inexpensive. However, it is difficult to secure materials to polyethylene using adhesives. The same is true for some other materials suitable for use as the second sheet. The four strips of fiber-reinforced plastics material, which are secured to marginal areas of the second sheet by the fastening means, enable the protective strips to be secured in place by adhesive materials such as vinyl cement so that they can prevent damage to the stitching or other fastening means.

DETAILED DESCRIPTION OF THE PREFERRED EMBODIMENT

Figure 1:
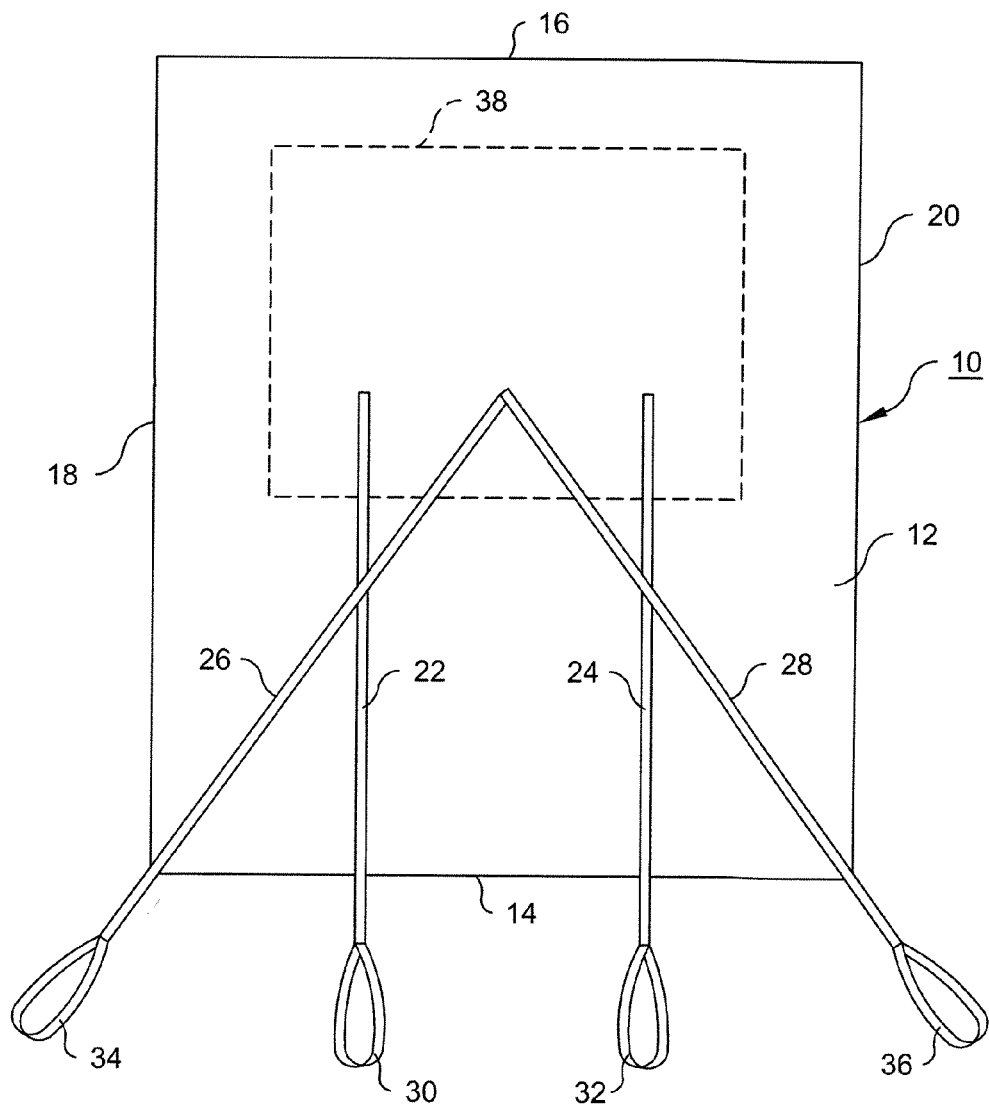
FIG. 1 is a top plan view of a tarpaulin according to the invention.

As shown in FIG. 1, which shows the top face, the preferred tarp 10 according to the invention comprises a flexible, rectangular first sheet 12. This first sheet is preferably composed of a fiber-reinforced plastics material. For example, the sheet 12 can consist of a nylon mesh coated with PVC (poly(vinyl chloride)), or a laminate composed of one or more layers of nylon mesh and two or more layers of PVC. The sheet is similar to a conventional hauling tarp, and has a front edge 14, a rear edge 16, and side edges 18 and 20. The sheet can be provided in a wide range of sizes. A practical size for general landscaping applications is 2.5 meters in width (from side edge 18 to side edge 20, and 3.5 meters in length from the front edge 14 to the rear edge 16. The thickness of the sheet 12 is typically in the range from approximately 0.25 mm to 0.60 mm. The first sheet, while preferably rectangular, can have a different shape. For example, the front edge 14 can be a rounded convex front edge instead of a straight front edge as shown. The side and rear edges can also have various shapes, and need not be straight.

Straps 22, 24, 26 and 28, of woven fabric are sewn to the top face of the tarp, and are formed with loops 30, 32, 34, and 36 at their free ends which can be gripped manually by one or more individuals for pulling the tarp along the ground. A second sheet 38, on the bottom face of the sheet is shown in broken lines in FIG. 1. The second sheet 38 is rectangular, but smaller than the first sheet 12, and preferably positioned centrally between the side edges of the first sheet but closer to the rear edge 16 than to the front edge 14. The reason for this placement of the second sheet relative to the first sheet is to position the second sheet directly underneath the center of mass of the load on the tarp.

The second sheet 38 is a sheet of plastics material and at least the bottom surface, i.e., the exposed surface facing away from the first sheet, is smooth and capable of sliding easily over various kinds of terrain. The coefficient of friction of the exposed surface of the second sheet should be less than that of the bottom surface of the first sheet. Polyethylene is suitable as a material for the second sheet. The thickness of the second sheet should be such that it can be rolled easily, and accordingly, thicknesses in the range from approximately 0.5 mm to 1.2 mm are suitable. A sheet having a thickness of approximately 0.90 mm can be either folded or rolled easily, and has been found to exhibit good durability. The second sheet can be almost as large as the first sheet, but is preferably significantly smaller at least in the front-to-back direction, i.e. in the direction parallel to the side edges 18 and 20 of the first sheet. However, it is not necessary for the second sheet to underlie the front part of the first sheet, as the front part of the first sheet is ordinarily separated from the ground when the tarp is being pulled while carrying a load. On a tarp in which the first sheet is 3.5 meters long and 2.5 meters wide, a suitable size for the second sheet is approximately 1.2 meters in width and 1.0 meters in length, the length being measured along a direction parallel to the sides 18 and 20 of the first sheet.

Figure 2:
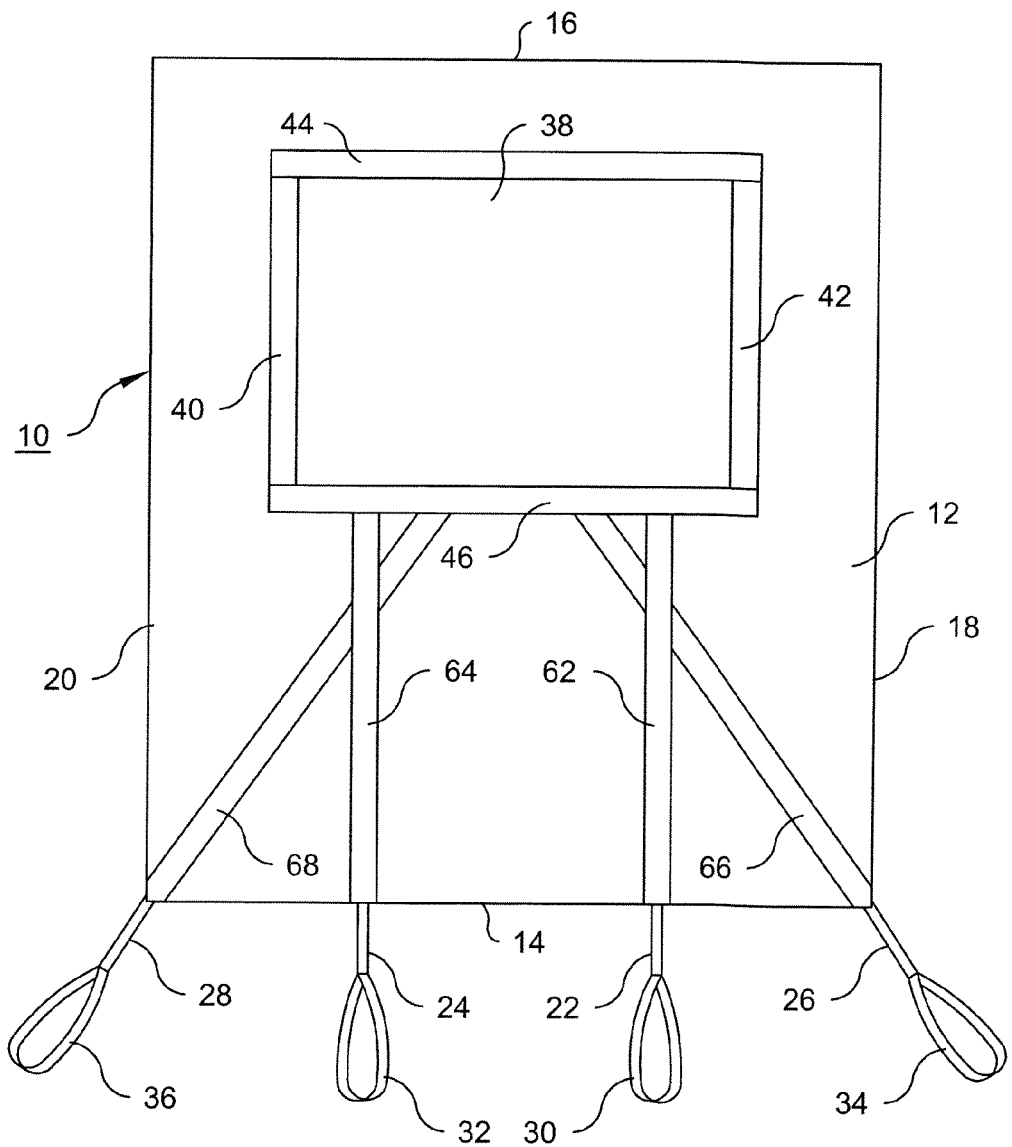
FIG. 2 is a bottom plan view thereof.

As shown in FIG. 2, the second sheet 38 is located centrally between the side edges 18 and 20 of the first sheet 12, but is closer to the rear edge 16 of the first sheet than to the front edge 14. The edges of the second sheet are covered by narrow protective strips 40, 42, 44 and 46, which can be made from the same fiber-reinforced plastics material from which the first sheet 12 is made.

Figure 3:
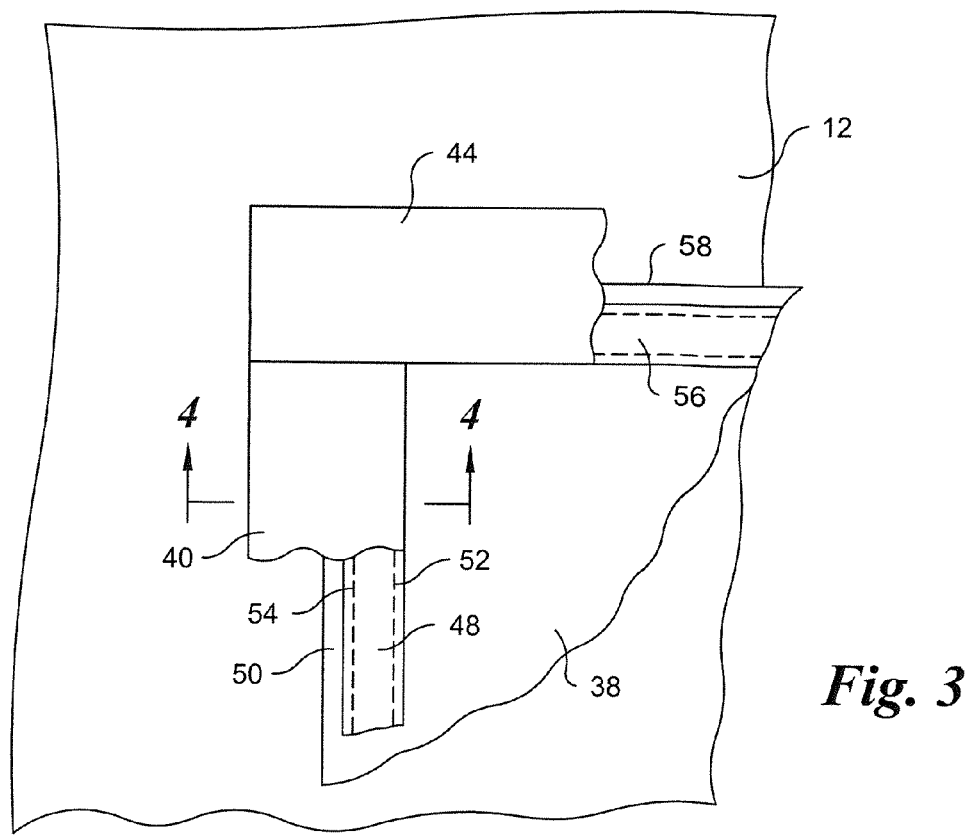
FIG. 3 is an enlarged, partially broken-away bottom plan view of a portion of the tarpaulin, showing the attachment of the second sheet to the first sheet.

FIG. 3 shows protective strips 40 and 44 broken away to illustrate the attachment of the second sheet 38 to the first sheet 12. A narrow intermediate strip 48 of fiber-reinforced plastics material, which can also be the same material as that from which the first sheet is made, extends along the bottom surface of the second sheet near and parallel to longitudinal edge 50 of the second sheet and is attached to the first sheet by rows 52 and 54 of stitching, which pass through the strip 48, second sheet 38 and first sheet 12. A similar narrow strip 56 extends parallel to the rear edge 58 of the second sheet 38, and is also attached to the second and first sheets by stitching. The other two edges of the second sheet 38 (not shown) are also provided with narrow strips similar to strips 48 and 56 and secured to the first sheet by stitching.

The yarns used for stitching can be monofilament nylon yarns or yarns of various other materials and construction, including multi-filament yarns. Stitching is preferably carried out by machine, and any of various kinds of stitching can be used, including chain stitching, lockstitching and the like. The narrow strips 48 and 56 enable the protective strips 40, 42, 44 and 46 to be secured in place by an adhesive such as a vinyl cement, which will not adhere satisfactorily to polyethylene or to various other materials suitable for use as the material of the second sheet. The narrow strips, which are fiber-reinforced, also prevent the stitching from causing deformation of sheet 38 as a result of tension in the yarns, and ultimately loosening the connection between the first and second sheets of the tarp. Protective strips 40, 42, 44 and 46 (FIG. 2) in turn protect the exposed parts of the stitching from being damaged by contact with the terrain over which the tarp is being pulled.

Figure 4:
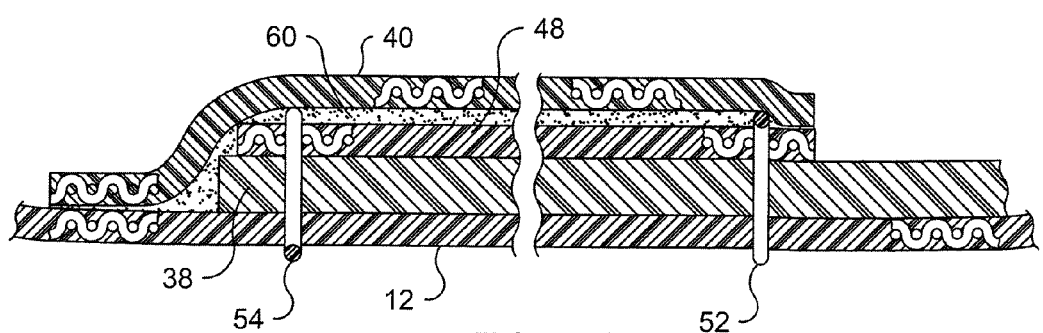
FIG. 4 is a cross-sectional view of a portion of the tarpaulin as seen through section plane 4-4 in FIG. 3.

Details of the attachment of the second sheet 38 to the first sheet 12 are shown in FIG. 4. In that figure, it will be seen that the protective strip 40 is bonded to the first sheet 38, and to strip 48 by a layer 60 of adhesive, which can be a vinyl adhesive of the kind used for tarpaulin repair, or any of various other suitable adhesives. A polyurethane in a solvent mixture composed of acetone, methyl ethyl ketone and toluene is an example of a typical adhesive composition. The protective strip 40 extends past stitching 52 toward the exposed part of sheet 38, but, because it cannot be bonded satisfactorily to the second sheet, it preferably does not extend past the inside edge of strip 48. The inside edge of strip 40 is preferably positioned directly over the inside edge of strip 48, or over a location on strip 48 between the inside edge of strip 48 and the line of stitching 52.

As shown in FIG. 2, protective strips 62, 64, 66 and 68, which are secured by an adhesive to the bottom face of the first sheet 12, can be provided to protect the stitching used to secure the fabric straps 22, 24, 26 and 28 to the first sheet from deterioration by abrasion.

Figure 5:
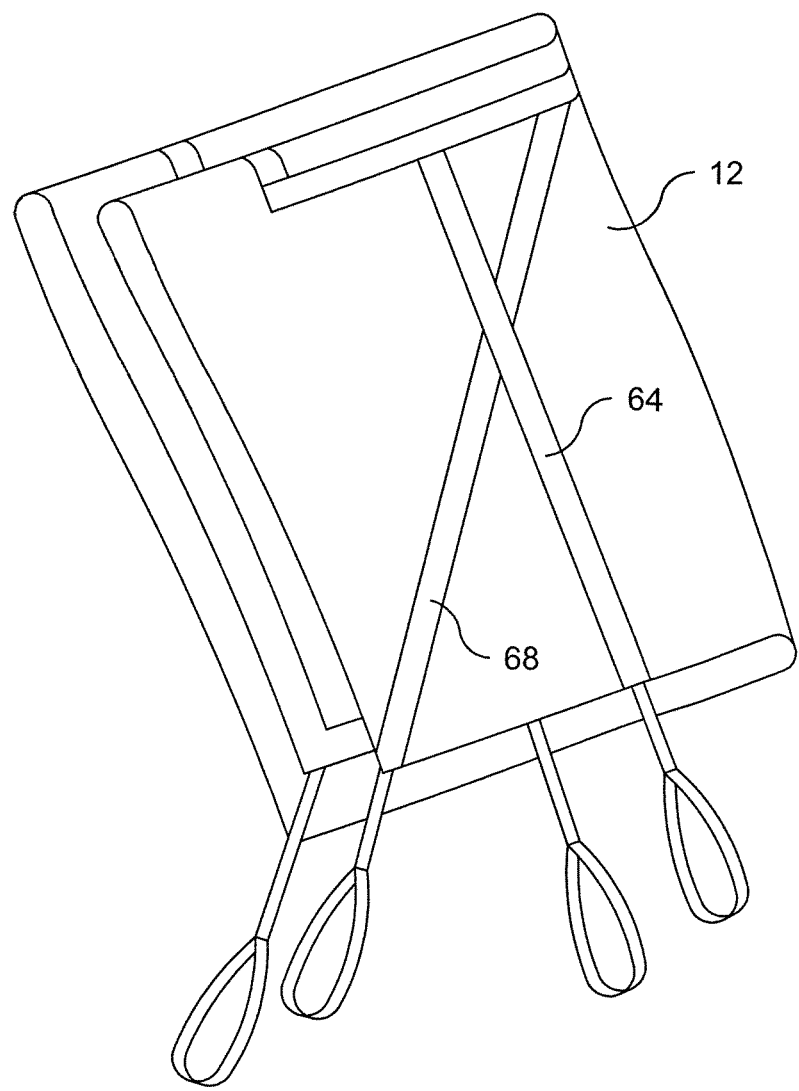
FIG. 5 is a perspective view showing the tarpaulin folded for storage.

Because of the flexibility of the second sheet, the tarp can be rolled for storage, or even folded for storage as illustrated in FIG. 5.

The tarp can be provided in a variety of sizes, and is not necessarily rectangular in shape. For example, as mentioned above, the front edge 14 can be in the form of a convex arc. The second sheet, while preferably rectangular so that the strips 48, 56, etc., and the protective strips 40-46, can be simple, straight strips, can also have any of various shapes other than rectangular. The second sheet can also be composed of two or more parts at least one of which has a flexibility that allows both sheets to be either rolled or folded for storage. Still other modifications may be made to the apparatus and method described above without departing from the scope of the invention as defined in the following claims.

What is claimed is:

1. A tarpaulin for hauling landscaping material and debris over terrain comprising:
    a flexible first sheet of fiber-reinforced plastics material having a top face and a bottom face; and
    a flexible second sheet of plastics material, said flexible second sheet also having a top face and a bottom face;
    wherein the first and second sheets are connected to each other with the top face of the second sheet in facing contact with the bottom face of the first sheet; and
    wherein said second sheet has a smooth bottom face and sufficient flexibility to allow both sheets to be rolled for storage;
    wherein said flexible first sheet of fiber-reinforced plastics material has a front edge, a rear edge, and first and second opposite side edges, each side edge of the first sheet extending from the front edge to the rear edge;
    wherein said flexible second sheet of plastics material also has a front edge, a rear edge, and first and second opposite side edges, each side edge of the second sheet extending from the front edge of the second sheet to the rear edge of the second sheet;
    wherein the rear edge and the first and second side edges respectively of the second sheet are in inwardly spaced relationship to the rear edge and first and second side edges of said first sheet, forming margins along the rear and side edges of the second sheet;
    wherein the front edge of the second sheet is also spaced inwardly from the front edge of the first sheet, forming a margin along the front edge of the second sheet; and
    wherein the second sheet is secured along each of its front, rear and side edges to the first sheet by fastening means extending through both sheets;
    said tarpaulin comprising elongated protective strips underlying said fastening means, whereby when the tarpaulin is being pulled and the bottom face of the second sheet is in sliding contact with terrain, the fastening means is prevented from coming into direct contact with the terrain;
    said tarpaulin further comprising four intermediate strips of plastics material, each said intermediate strip extending along an area of the bottom face of the second sheet adjacent a different one of said front, rear, and side edges of said second sheet, each of said protective strips having a part underlying a different one of said four intermediate strips, and each said protective strip being adhesively secured to one of said four intermediate strips.

2. The tarpaulin according to claim 1, in which each of said four intermediate strips is composed of fiber-reinforced plastics material.

3. The tarpaulin according to claim 1, wherein each of said protective strips has a second part underlying a portion of the bottom face of said first sheet adjacent an edge of said second sheet, and each said protective strip is also adhesively secured to an area of the bottom face of the first sheet adjacent the intermediate strip to which the protective strip is adhesively secured.

4. The tarpaulin according to claim 3, in which said fastening means includes stitching extending through the top face of the first sheet, through said second sheet and through said intermediate strips, and in which said protective strips underlie said stitching.

5. The tarpaulin according to claim 1, in which said fastening means includes stitching extending through the top face of the first sheet, through said second sheet and through said intermediate strips, and in which said protective strips underlie said stitching.

6. The tarpaulin according to claim 5, in which each of said four intermediate strips is composed of fiber-reinforced plastics material.

7. A tarpaulin for hauling landscaping material and debris over terrain comprising:
    a flexible first sheet of fiber-reinforced plastics material having a top face and a bottom face; and
    a flexible second sheet of plastics material, said flexible second sheet also having a top face and a bottom face;
    wherein the first and second sheets are connected to each other with the top face of the second sheet in facing contact with the bottom face of the first sheet; and
    wherein said second sheet has a smooth bottom face and sufficient flexibility to allow both sheets to be rolled for storage;
    wherein said flexible first sheet of fiber-reinforced plastics material has a front edge, a rear edge, and first and second opposite side edges, each side edge of the first sheet extending from the front edge to the rear edge;
    wherein said flexible second sheet of plastics material also has a front edge, a rear edge, and first and second opposite side edges, each side edge of the second sheet extending from the front edge of the second sheet to the rear edge of the second sheet;
    wherein the rear edge and the first and second side edges respectively of the second sheet are in inwardly spaced relationship to the rear edge and first and second side edges of said first sheet, forming margins along the rear and side edges of the second sheet;
    wherein the front edge of the second sheet is also spaced inwardly from the front edge of the first sheet, forming a margin along the front edge of the second sheet;
    wherein the second sheet is secured along each of its front, rear and side edges to the first sheet by fastening means extending through both sheets;

wherein said tarpaulin comprises elongated protective strips underlying said fastening means, whereby when the tarpaulin is being pulled and the bottom face of the second sheet is in sliding contact with terrain, the fastening means is prevented from coming into direct contact with the terrain; and wherein the rear edge of the second sheet is in substantially parallel relationship to the rear edge of the first sheet and the first and second side edges of the second sheet are substantially parallel respectively to the first and second side edges of the first sheet.

8. A tarpaulin for hauling landscaping material and debris over terrain comprising:

a flexible first sheet of fiber-reinforced plastics material having a top face and a bottom face, a front edge, a rear edge, and first and second opposite side edges, each side edge extending from the front edge to the rear edge;

a flexible second sheet of plastics material, said flexible second sheet also having a top face and a bottom face, a front edge, a rear edge, and first and second opposite side edges, each side edge of the second sheet extending from the front edge of the second sheet to the rear edge of the second sheet, the second sheet having its top face in facing relationship with the bottom face of the first sheet, and having its rear edge and its first and second side edges respectively in inwardly spaced relationship to the rear edge and first and second side edges of said first sheet, forming margins along the rear and side edges of the second sheet, with the front edge of the second sheet being spaced inwardly from the front edge of the first sheet by a distance greater than the width of the largest of said margins;

an elongated strip of flexible, fiber-reinforced plastics material extending lengthwise along each of said front, rear and side edges of said second sheet, each said elongated strip underlying and in facing contact with a marginal portion of the bottom face of the second sheet along one of said edges of the second sheet; and fastening means passing through the elongated strip, said second sheet, and said first sheet, said fastening means securing said elongated strip to said first sheet, and sandwiching a marginal portion of said second sheet between said elongated strip and said first sheet;

wherein said second sheet has a smooth bottom face, the coefficient of friction of said smooth bottom face being less than the coefficient of friction of the bottom face of said flexible first sheet and wherein said second sheet also has sufficient flexibility to allow both sheets to be rolled for storage.

9. The tarpaulin according to claim 8, in which said second sheet has a thickness greater than the thickness of the first sheet.

10. The tarpaulin according to claim 8, in which said second sheet has a thickness in the range from 0.5 to 1.2 millimeters.

11. The tarpaulin according to claim 8, in which said second sheet is composed of polyethylene.

12. The tarpaulin according to claim 11, in which said second sheet has a thickness greater than the thickness of the first sheet.

13. The tarpaulin according to claim 11, in which said second sheet has a thickness in the range from 0.5 to 1.2 millimeters.

14. The tarpaulin according to claim 8, wherein said fastening means comprises first and second rows of stitching extending along the length of each said elongated strip, said first and second rows of stitching passing through the last-mentioned elongated strip, said second sheet, and said first sheet, securing said elongated strip to said first sheet.

15. The tarpaulin according to claim 14, in which said second sheet has a thickness greater than the thickness of the first sheet.

16. The tarpaulin according to claim 14, in which said second sheet has a thickness in the range from 0.5 to 1.2 millimeters.

17. The tarpaulin according to claim 14, in which said second sheet is composed of polyethylene.

18. The tarpaulin according to claim 17, in which said second sheet has a thickness greater than the thickness of the first sheet.

19. The tarpaulin according to claim 17, in which said second sheet has a thickness in the range from 0.5 to 1.2 millimeters.

20. The tarpaulin according to claim 14, including four protective strips each of said protective strips underlying the first and second rows of stitching along the length of each said elongated strip of flexible, fiber-reinforced plastics material, each said protective strip being adhesively secured to the elongated strip of flexible, fiber-reinforced plastics material through which the last-mentioned first and second rows of stitching material pass.

* * * * *